United States Patent
Appleton

[11] 4,016,404
[45] Apr. 5, 1977

[54] CREDIT CARD VERIFIER

[76] Inventor: Frank Appleton, 1230 Niagara St., Flint, Mich. 48803

[22] Filed: Aug. 5, 1975

[21] Appl. No.: 602,105

[52] U.S. Cl. .................... 235/61.7 B; 340/149 A
[51] Int. Cl.² .................. G06K 7/00; G06K 7/08
[58] Field of Search ........... 235/61.7 R, 61.7 A, 235/61.7 B, 61.12 R, 61.12 C, 61.12 N, 61.12 M, 61.11 R, 61.11 A, 61.11 B, 61.11 C, 61.11 D, 61.11 E; 340/149 A

[56] References Cited
UNITED STATES PATENTS

| | | | |
|---|---|---|---|
| 3,401,830 | 9/1968 | Mathews | 235/61.7 B |
| 3,513,298 | 5/1970 | Riddle et al. | 235/61.11 |
| 3,651,310 | 3/1972 | Link | 235/61.11 B |
| 3,662,343 | 5/1972 | Goldstein et al. | 235/61.7 B |
| 3,665,162 | 5/1972 | Yamamoro et al. | 235/61.7 B |
| 3,740,530 | 6/1973 | Hotter et al. | 235/61.7 B |
| 3,764,742 | 10/1973 | Abbott et al. | 235/61.7 B |
| 3,786,420 | 1/1974 | Stambler | 235/61.7 B |
| 3,846,622 | 11/1974 | Meyer | 235/61.7 B |
| 3,919,528 | 11/1975 | Cooper et al. | 235/61.7 B |

*Primary Examiner*—Vincent P. Canney
*Attorney, Agent, or Firm*—Gifford, Chandler, Sheridan & Sprinkle

[57] ABSTRACT

A credit card having information stored thereon in the form of a matrix of apertures formed through the credit card in a predetermined order, and a verifier adapted to read the information matrix from the credit card and by comparison of the information encoded on the credit card with a comparison code manually entered by a user through a keyboard, determine whether the credit card use is authorized. The verifier generally comprises a processing unit operatively coupled to a random access memory into which the encoded information on the credit card is stored. The processing unit is pre-programmed with the matrix bit positions and the sequence of a scrambler code and the numerical value of the scrambler code is then determined. The processing unit is further pre-programmed to determine the matrix bit positions and the sequence of a user code from the information matrix as a function of the numerical value of the scrambler code so that the numerical value of the user code can be determined. The numerical value of the user code is then compared with the manually entered comparison code and indicating means are activated in response to the comparison to indicate whether the card use is authorized or unauthorized.

9 Claims, 2 Drawing Figures

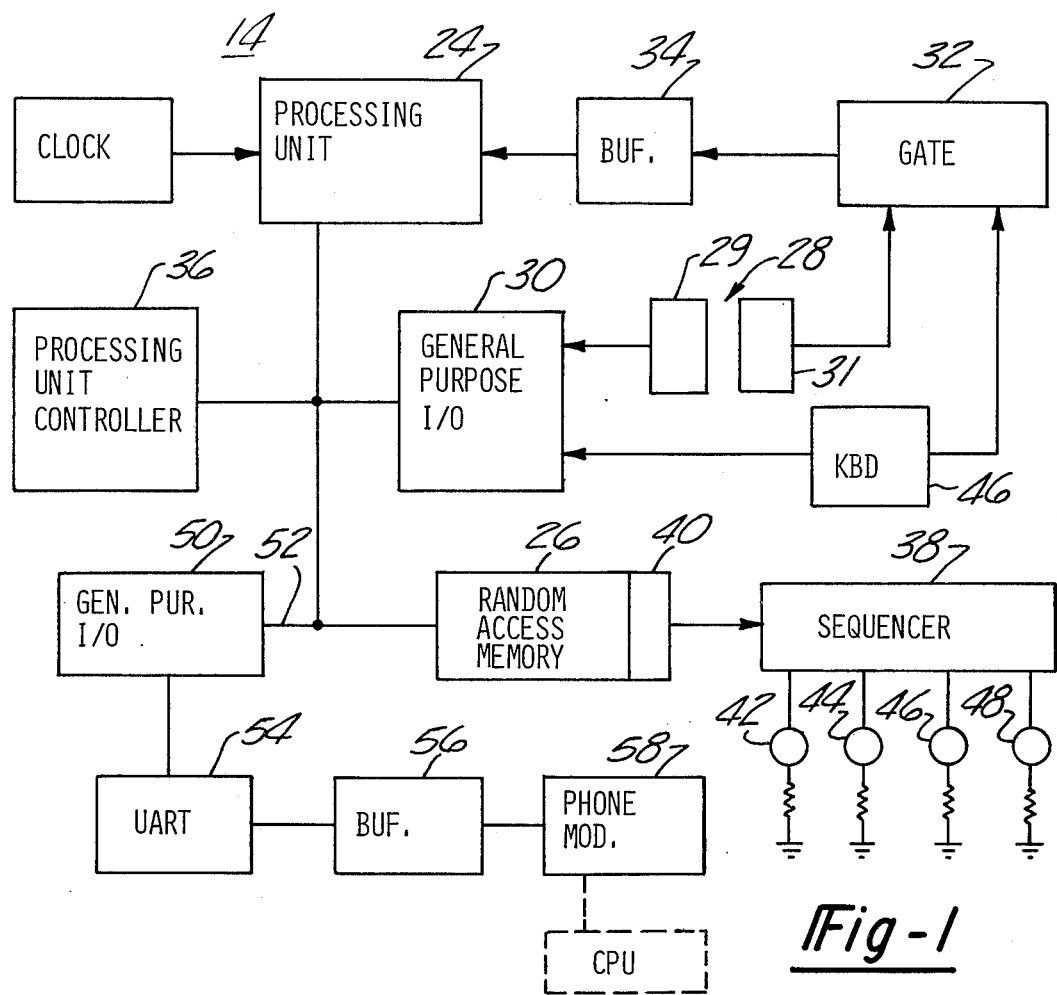
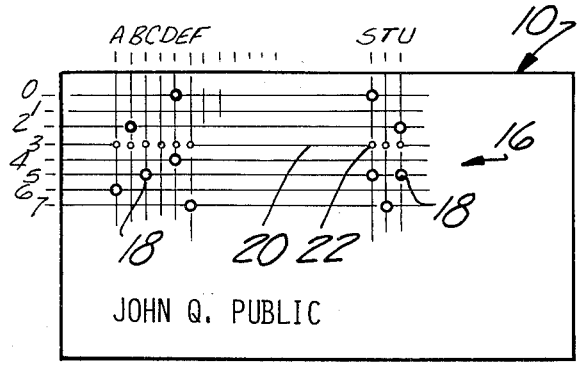
Fig-2
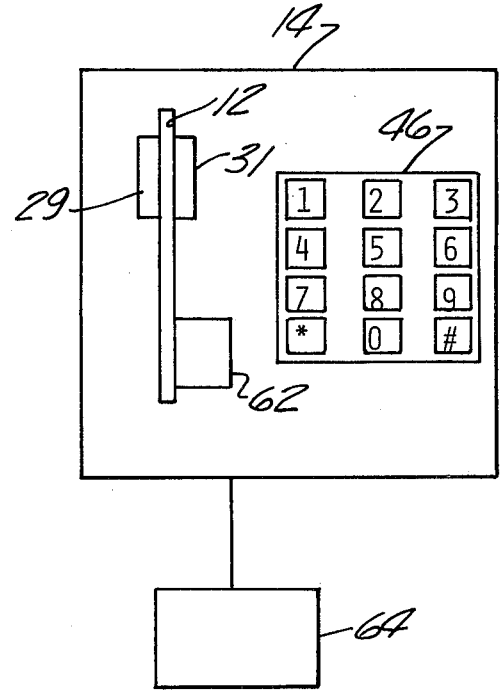

CREDIT CARD VERIFIER

BACKGROUND OF THE INVENTION
1. Field of the Invention

The present invention relates to a credit card verifier in combination with an encoded credit card to determine unauthorized use of the credit card.

2. Description of the Prior Art

In modern times credit cards have enjoyed widespread popularity and acceptance in a multiplicity of applications. The previously known credit cards typically contained only an account number, customer name, and customer signature strip imprinted thereon.

Due to the growing willingness of retailers and the like to accept credit cards in lieu of cash, credit card theft and the subsequent unauthorized use of the credit card has become a problem of growing magnitude. Although a comparison of the customer's signature with the signature on the previously known signature strip has been intended to detect unauthorized use of the credit card, in practice it has been found that not only are retailers unwilling to carefully compare the customer's signature with the signature on the signature strip, but also credit card thieves have been found to possess an unexpected aptitude in forgery. To date the above mentioned disadvantages of the previously known credit cards have resulted in millions of dollars in stolen merchandise due to the unauthorized use of the credit card.

Other attempts to prevent unauthorized credit card use have proven inadequate. The unavoidable time lag between notification to the credit card company of a credit card theft and the resulting notification to retailers provides ample opportunities for the credit card thief to unlawfully use the credit card. An additional problem in this respect arises in the actual notification to all retailers that a particular credit card has been stolen is not only expensive and time consuming but also it isdifficult to reach all retailers who accept any given credit card. Organized credit card theft rings have further increased this problem by distributing stolen credit cards to geographical areas away from where the credit card was stolen.

Other credit card verification schemes have also proven inadequate in operation. In one type of previously known credit card verification system, the credit card is inserted into a module located at the retailer's place of business. The module in turn is connected to a central data processor which compares the credit card number to determine if the credit card is stolen. This type of credit card verification system suffers two major disadvantages. First, the verification system is unduly expensive, both in equipment and computer time, so that only major retailers are capable of absorbing the cost of the system. Secondly, this previously known verification scheme is totally ineffective between the time of the credit card theft and the notification to the credit card company of the theft. Therefore, thousands of dollars of unlawful credit card purchases may be incurred before the central processor is programmed to reject a particular credit card.

Other attempts at detecting forged or altered credit cards have involved placing magnetic codes, strips, or the like on the credit card. The disadvantage of the previously known magnetically encoded cards and the like are that the codes are easily deciphered so that professional credit card thieves can easily either alter the credit card or alternatively manufacture forged credit cards. Such magnetically encoded cards suffer the further disadvantage in that the manufacture of such cards is very expensive and also requires relatively expensive machinery. Moreover, no adequate method has been devised to magnetically encode existing credit cards; rather the entire credit card must be remanufactured with the desired magnetic coding. The cost of manufacturing large quantities of new, magnetically encoded, cards is necessarily prohibitive.

SUMMARY OF THE PRESENT INVENTION

The credit card verifier of the present invention in combination with a specially prepared credit card overcomes the above mentioned disadvantages of the previously known credit card verification systems. The credit card of the present invention includes a digitally encoded information matrix formed thereon so that each matrix position contains one bit of digital information. Preferably the credit card is digitally encoded by forming a plurality of apertures through the credit card in a predetermined order. The digitally encoded information on the credit card may contain any desired information but it at least includes a user code and a scrambler code for a purpose to become hereinafter apparent. The coding apertures in the credit card in the present invention may be punched through existing credit cards thereby obviating the necessity of remanufacturing new credit cards with magnetic coding as was previously known. In addition it should be apparent that the manufacturing costs involved in punching apertures through the credit card is considerably less than magnetically encoded credit cards.

The credit card is inserted into the card verifier of the present invention. The card verifier essentially comprises a reader, a processing unit, and a memory unit. The reader detects the information from the credit card information area matrix and stores this information in the memory unit. The processing unit is then pre-programmed with the matrix bit positions and the sequence of the bit positions for the scrambler code so that the processing unit deciphers the scrambler code from the information matrix and thereafter determines the value of the scrambler code.

After the value of the scrambler code has been determined by the processing unit, the processing unit is further pre-programmed to determine the matrix bit position and the sequence of the user code as a function of the numerical value of the scrambler code and the numerical value of the user code is then determined. In this manner the value of the scrambler code, which may assume vitually any numerical value within finite bounds, determines the matrix bit position and sequence for the user code from the credit card information matrix. Thus even if a credit card thief could determine the numerical value of the scrambler code from the credit card, the thief still could not decipher the user code.

The card verifier also includes a keyboard operatively linked with the processing and memory units so that the credit card user may manually enter a comparison code, known only to the credit card user, into the verifier. The comparison code is then compared to the value of the user code determined by the processing unit and indicating means within the verifier are then activated as a result of the comparison. For example, if the correct comparison code is manually entered on the keyboard a light may be activated for the merchandiser showing that the credit card use is authorized. Conversely, when the incorrect comparison code is entered onto the keyboard, indicating means may be activated directing the merchandiser to retain the card and therefore prevent further unauthorized use of the card. In a modification of the present invention mechanical means may also be used to retain the card whenever the incorrect comparison code is entered by the credit card user.

The combination of the present invention thus permits rapid verification that the credit card use is either authorized or unauthorized. Moreover by the use of the value of the scrambler code to locate the matrix bit position and sequence of the user code, even organized credit card theft rings will be unable to decipher the information matrix and alter existing credit cards or manufacture forged cards. Moreover, unlike the previously known credit card verification schemes, not only is the credit card encoding, but also the credit card verifier of the present invention, relatively inexpensive to construct.

BRIEF DESCRIPTION OF THE DRAWINGS

The combination of the credit card and the credit card verifier of the present invention will be more clearly understood by reference to the following detailed description when read in conjunction with the accompanying drawing, wherein like reference characters refer to like parts throughout the several views, and in which:

FIG. 1 is a block diagram showing the verifier of the present invention; and

FIG. 2 is a partial diagrammatic view showing the combination of the credit card and the verifier of the present invention.

DETAILED DESCRIPTION OF THE PRESENT INVENTION

Referring first to FIG. 2, a carrier 10, hereinafter referred to as a credit card, is shown adapted to be inserted into a slot 12 of a card verifier 14. The credit card 10 includes an information area matrix 16 containing a plurality of apertures 18 formed through the credit card 10 in a predetermined fashion as will become hereinafter apparent. In the illustration shown in FIG. 2, the apertures 18 are prearranged on the card 10 in a manner similar to a short strip of conventional punched paper. More specifically the apertures 18 are arranged in an information area matrix 16 having 21 columns, designated A-U, and eight rows, designated 0-7. Each matrix position, or coordinate, represents one bit of binary information. For example, an aperture 18 at matrix position B3 represents a binary 1 whereas a lack of an aperture 18 at matrix position B3 represents a binary 0.

A conventional timing strip 20 having apertures 22, preferably smaller in diameter than the apertures 18, are also provided along the information area 16 in the conventional fashion. It will be understood however that the arrangement of the information area matrix 16 shown in FIG. 2 is by way of illustration only and that no unnecessary limitations shall be drawn therefrom. For example the information matrix may comprise any desired number of rows and columns and may be encoded by any conventional means without deviating from the spirit or the scope of the present invention.

A predetermined number, for example twenty, of bit positions in the information area matrix 16 are assigned to a scrambler code. Preferably the twenty bit positions assigned to the scrambler code are randomly distributed across the information area matrix in the sense that any of the 168 matrix bit positions may represent the first bit of the scrambler code. Likewise, any of the remaining 167 bit positions within the information area matrix 16 may be assigned as the second bit of the scrambler code and so on for all twenty bits of the scrambler code. It is to be understood, however, that the actual matrix bit positions and sequence for the scrambler code within information area matrix 16 is predetermined. It should also be understood that with twenty bit positions assigned to the scrambler code, the scrambler code may be encoded with over one million different numerical values.

Like the scrambler code, a predetermined number of matrix bit positions, for example 68 bit positions, contain a binary representation of a user code. Like the scrambler code, the user code may be distributed throughout the information area matrix 16 in any desired predetermined order as will become hereinafter apparent. The remaining matrix bit positions on the information area matrix 16 may contain additional codes and information as required. In particular, a check-sum code is also encoded on the information area matrix 16 for a reason to become hereinafter apparent. It should also be apparent that thus far described, unlike the more conventional ASCII code or the like, the information encoded in the information area matrix 16 of the present invention cannot be deciphered upon mere visual inspection of the card 10 since the various codes utilized are intermixed amongst each other within the information area matrix 16.

A block diagram for the card verifier 14 is illustrated in FIG. 1 and generally comprises a processing unit, such as an Intel Part No. 4040, operatively linked with a random access memory unit 26, such as an Intel Part No. 4002. A reader 28 is positioned within the verifier and is adapted to read the information area matrix 16 on the credit card 10. The reader 28 is preferably a LED sensor 29 and source 31, such as a Fairchild FPA-100, so that one column of information from the information area matrix 16 is fed into the memory unit 26 through a general purpose I/O unit 30 such as an Intel Part No. 4207 as the card 10 passes in between the sensor 29 and source 31. In order to provide the proper timing required to accurately read the information from the information area matrix 16, the output from the reader 28 corresponding to the timing strip 22 on the information area matrix 16 is fed through a gate 32, a buffer 34 and into the processing unit 24. The processing unit 24, in response to the timing strip 22 signal, selectively gates the information from the reader 28 through the I/O unit 30 and into the memory unit 26 until all of the matrix bit positions on the information area 16 have been read by the reader 28 and stored in the memory unit 26. A conventional processing unit controller 36, such as a read-only memory, contains a set of pre-programmed instructions which operatively control the processing unit, as is well known in the art.

After the information area matrix 16 has been read and stored within the memory unit 26, the controller 36 and processing unit 24 decipher the scrambler code from the stored information and determine the numerical value of the scrambler code. It will be understood that at least for a given type of credit card, such as an XYZ Oil Company credit card, the matrix bit position and sequence for the scrambler code are identical.

However, the actual numerical value of the scrambler code on the information area 16 varies from one particular card 10 to another. Thereafter the matrix bit positions and the sequence of the user, the check-sum, and all other codes on the information area matrix 16 are determined by the processing unit 24 as a function of the numerical value of the scrambler code and the numerical values of the other codes are determined.

In the preferred form of the invention the processing unit 24 performs a binary addition of each bit encoded on the information area matrix 16. The sum of the binary addition is then compared to the numerical value encoded in the check-sum code and the result of the comparison is then utilized to drive a sequencing unit 38 from an output port 40 on the memory unit 26. Thus if additional apertures 18 have been formed through the information area matrix 16, or conversely if existing apertures have been covered, the value of the binary summation of the information area matrix 16 will be altered so that the processing unit 24 will detect the difference between the binary summation and the value of the check-sum and direct the sequencing chip 38 to activate an indicator 42, such as a lamp, showing that the card 10 has been altered.

Assuming that the card has not been altered and that the value of the check-sum corresponds to the binary summation of the information area matrix 16, a second indicator 44 is activated directing the credit card user to manually enter a comparison code number, known only to the credit card user, on a keyboard 46. The processing unit 24 in response to the signal received from the keyboard 46 through the selective gate 32 and buffer 44 directs the comparison code entered by the card user through the I/O unit 30 to the memory unit 26. The processing unit 24, pre-programmed by the controller 36, then arithmetically compares the value of the user code deciphered from the information area 16 with the comparison code manually entered via the keyboard 46 by the card user, and activates the sequencer 38 as a result of the comparison. If the user code favorably compares with the comparison code thus indicating that the credit card use is authorized, an indicator 46 is activated. Otherwise still another indicator 48 is activated showing that the credit card use is unauthorized and the retailer is instructed to retain the credit card.

The utilization of the numerical value of the scrambler code to determine the matrix bit positions and sequence according to the user code of the present invention provides a means whereby the information encoded on the information area matrix 16 is virtually undecipherable particularly since, as has been previously described, the scrambler code may have over a million different numerical values. Thus even the most organized credit card theft ring will be unable to determine the user code from a stolen credit card even if the scrambler code could be deciphered. Hence the comparison code could not be determined from a stolen credit card thereby effectively preventing unauthorized use of the stolen credit card. Moreover the use of the encoded check-sum on the information area matrix 16 effectively prevents any alteration to the information contained therein.

As previously mentioned, additional information, such as a credit card user's social security number and/or account number may also be encoded in the information area matrix 16 preferably in a manner similar to the user and check-sum code. In order to utilize this additional information a second general purpose I/O unit 50 may be operatively coupled by a line 52 with the processing unit 24. The I/O unit 50 in turn is coupled to a Universal Asyncronous Receiver Transmitter 54 (UART) and buffer 56 so that the information processed by the processing unit 24 may be communicated through a conventional telephone module 58 to a central processing unit 60 in the well known manner. Utilizing this scheme, billing information and the like may be communicated directly to and from a central processor from the verifier 14 of the present invention. Thus not only is billing information immediately received and recorded by the central processor, but also the handling costs required with the previously known credit card charge slips is totally eliminated.

Still other improvements and uses of the present invention are possible. For example as shown in FIG. 2 mechanical means 62 may be utilized to mechanically retain a credit card 10 after an incorrect comparison code has been entered by the credit card user. The mechanical means 62 will of course prevent an unauthorized credit card user from snatching the credit card 10 from the slot 12 and fleeing after his unauthorized use has been discovered.

As indicated in FIG. 2, the credit card verifier 14 may also be utilized to activate an external apparatus 64, such as a gasoline pump, upon the correct entry of the comparison code by the credit card user. This use would be particularly advantageous at a self-service gasoline station since the service station could remain open 24 hours a day each day without an operator. In this embodiment the verifier 14 would not only prevent unauthorized use of stolen credit cards 10 but would also simultaneously record or transmit billing information to a central processor or the like.

It can thus be seen that the verifier 14 in combination with the credit card 10 obtains advantages unknown to the previously known credit card verification systems. As has been previously described in detail, the information contained on the information area 16 is virtually undecipherable thereby preventing not only alterations of the credit card but also forgeries. In addition, not only is the encoding of the cards 10 by apertures 18 many times less expensive than the previously known magnetically encoded cards, but also that existing credit cards may be encoded with the apertures 18 without the necessity of manufacturing new credit cards. It will be understood, however, that the information area matrix 16 may be magnetically encoded with a scrambler and user code without deviating from the spirit or scope of the invention, although the aperture 18 encoding is the preferred form of the invention.

Having thus described my invention many modifications thereto will become apparent to those skilled in the art to which it pertains without deviating from the spirit of the invention as defined by the scope of the appended claims.

What is claimed is:
1. In combination,
    a carrier having binary information encoded in an information area matrix on said carrier, said information matrix including at least a scrambler code in a predetermined bit position and sequence in said information matrix, and a user code wherein the bit position and sequence of the user code within the information area matrix is dependent upon the numerical valve of the scrambler code, and a verifier, said verifier comprising means for reading said information from said information area matrix, means for storing said information, means for determining the numerical value of said scrambler code, and means for determining the matrix bit position and sequence of said user code as a function of the numerical value of said scrambler code, means for manually entering a comparison code into said verifier, means for comparing said comparison code to said user code, and means for indicating the result of said comparison.

2. The combination as defined in claim 1 wherein said information area matrix includes a checksum encoded thereon, said verifier further comprising means for performing binary addition of said information area matrix, means for comparing the result of said binary addition to said check-sum, and means for indicating the result of said last mentioned comparison.

3. The combination as defined in claim 2 wherein said check-sum is encoded on said carrier in a predetermined matrix bit position and sequence dependent upon the numerical value of the scrambler code and said verifier includes means for determining the matrix bit position and sequence of said check-sum as a function of the numerical value of said scrambler code.

4. The combination as defined in claim 1 wherein said information is encoded on said carrier by a plurality of apertures formed through said carrier in a predetermined order.

5. The combination as defined in claim 1 wherein said verifier further comprises means to selectively mechanically retain said carrier in dependence on the result of said comparison.

6. The combination as defined in claim 1 wherein said verifier further comprises means for transmitting and receiving information to and from a central data processor.

7. The combination as defined in claim 1 wherein said verifier further comprises means to selectively actuate an external apparatus in dependence on the result of said comparison.

8. The combination as defined in claim 1 wherein said means for storing said information comprises a random access memory unit, said means for manually entering a comparison code comprises a keyboard, and said means for comparing said comparison code to said user code comprises a pre-programmed processor unit operatively coupled with said random access memory unit and said keyboard.

9. The combination as defined in claim 8 and including a read-only memory operatively coupled to said processing unit and pre-programmed with an instruction set for said processing unit.

* * * * *

UNITED STATES PATENT OFFICE
CERTIFICATE OF CORRECTION

Patent No. 4,016,404    Dated April 5, 1977

Inventor(s) Frank Appleton

It is certified that error appears in the above-identified patent and that said Letters Patent are hereby corrected as shown below:

Column 1, line 40, "isdifficult" should read -- is difficult --.

Column 6, line 67, "valve" should read -- value --.

Signed and Sealed this ninth Day of August 1977

[SEAL]

Attest:

RUTH C. MASON
Attesting Officer

C. MARSHALL DANN
Commissioner of Patents and Trademarks